United States Patent
Fang

(10) Patent No.: US 9,361,360 B2
(45) Date of Patent: Jun. 7, 2016

(54) METHOD AND SYSTEM FOR RETRIEVING INFORMATION FROM SEMANTIC DATABASE

(75) Inventor: Jun Fang, Shaanxi (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 153 days.

(21) Appl. No.: 13/814,940

(22) PCT Filed: Jul. 26, 2011

(86) PCT No.: PCT/CN2011/077615
§ 371 (c)(1),
(2), (4) Date: Feb. 8, 2013

(87) PCT Pub. No.: WO2013/013386
PCT Pub. Date: Jan. 31, 2013

(65) Prior Publication Data
US 2013/0138659 A1    May 30, 2013

(51) Int. Cl.
*G06F 17/30* (2006.01)

(52) U.S. Cl.
CPC ...... *G06F 17/30613* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 6,496,843 B1* | 12/2002 | Getchius et al. | 715/210 |
| 6,778,970 B2 | 8/2004 | Au | |
| 7,024,407 B2* | 4/2006 | Bradford | G06F 17/2785 707/739 |
| 7,548,933 B2* | 6/2009 | Krishnamurthy | G06F 17/241 |
| 7,702,614 B1* | 4/2010 | Shah et al. | 707/741 |
| 2003/0088543 A1* | 5/2003 | Skeen | G06F 17/22 |
| 2003/0177000 A1 | 9/2003 | Mao et al. | |
| 2006/0184468 A1* | 8/2006 | Adir | G06F 11/3684 706/16 |
| 2007/0073745 A1* | 3/2007 | Scott | G06F 17/30737 |
| 2007/0112803 A1 | 5/2007 | Pettovello | |
| 2008/0275694 A1 | 11/2008 | Varone | |
| 2009/0112905 A1* | 4/2009 | Mukerjee et al. | 707/102 |
| 2009/0144609 A1* | 6/2009 | Liang et al. | 715/230 |
| 2010/0036789 A1 | 2/2010 | Marleau | |
| 2010/0169234 A1* | 7/2010 | Metzger et al. | 705/348 |
| 2010/0250598 A1* | 9/2010 | Brauer et al. | 707/780 |
| 2011/0251984 A1* | 10/2011 | Nie | G06F 17/30731 706/18 |
| 2011/0320187 A1* | 12/2011 | Motik | G06F 17/278 704/9 |
| 2012/0221556 A1* | 8/2012 | Byrne et al. | 707/723 |

(Continued)

OTHER PUBLICATIONS

Hitzler et al. "Resolution-Based Approximate Reasoning for OWL DL", Springer-Verlag Berlin Heidelberg 2005 pp. 383-397.*

(Continued)

*Primary Examiner* — Polina Peach
(74) *Attorney, Agent, or Firm* — Ren-Sheng International

(57) ABSTRACT

Embodiments of the present disclosure set forth a method for retrieving information from a semantic database having a plurality of semantic data. The method includes selecting a hub that is resolved with a number of semantic data based on a resolution rule, when the number of the semantic data is greater than a threshold in an offline environment; calculating a semantic data set that is associated with the hub based on a searching approach and the resolution rule in the offline environment; indexing the semantic data set in the offline environment; modifying the semantic database to include the semantic data set in the offline environment; and retrieving information from the semantic data set in an online environment.

17 Claims, 3 Drawing Sheets

(56) References Cited

U.S. PATENT DOCUMENTS

2012/0259856 A1* 10/2012 Gehrking et al. ............. 707/739
2012/0303611 A1* 11/2012 Kusumura .......... G06F 17/3071
 707/722

OTHER PUBLICATIONS

Gruninger et al. "A Short Overview of FLOWS: A First-Order Logic Ontology forWeb Services", 2008 IEEE.*
Kok, et al., "Extracting Semantic Networks from Text via Relational Clustering", In Proceedings of the 2008 European Conference on Machine Learning and Knoledge Discovery in Databases, Antwerp, Belgium, 2008, 16 pages.*
Adnan Darwiche et al., "A Knowledge Compilation Map", Journal of Artificial Intelligence Research 17, 2002, pp. 229-264.
Franz Baader et al., "The Description Logic Handbook: Theory, Implementation, and Applications", Cambridge University Press, New York, 2003, pp. 47-100, Chapter 2, USA.
Tim Berners-Lee et al., "The Semantic Web", Scientific American, May 17, 2001, pp. 1-5.
Albert-Laszlo Barabasi et al., "Scale-Free Networks", Scientific American, May 2003, pp. 60-69.
Ramon Ferrer I Cancho et al., "The Small World of human Language", Proc. R. Soc. Lond. B 268, 2001, pp. 2261-2265 (Downloaded from rspb.royalsocietypublishing.org on Oct. 22, 2012).
Mark Steyvers et al., "The Large-Scale Structure of Semantic Networks: Statistical Analyses and a Model of Semantic Growth", Cognitive Science 29, 2005, pp. 3-27.
Wilfrid Hodges, "Classical Logic I: First-Order Logic", in Lou Goble, ed., The Blackwell Guide to Philosophical Logic, 2001, pp. 9-32.
Jianfeng Du et al., "A Decomposition-based Approach to Optimizing Conjunctive Query Answering in OWL DL", International Semantic Web Conference, 2009, pp. 1-30.
Julian Dolby et al., "Scalable Grounded Conjunctive Query Evaluation over Large and Expressive Knowledge Bases", In Proc. of ISWC'08, 2008, pp. 403-418.
Boris Motik et al., "Query Answering for OWL-DL with Rules", In Elsevier Web Semantics Journal, May 6, 2005. pp. 1-32.
Jon M. Kleinberg, "Authoritative Sources in a Hyperlinked Environment", Journal of the ACM, Sep. 1999, pp. 604-632, vol. 46, No. 5.
Allan M. Schiffman, "Hierarchy in Web Page Similarity Link Analysis", CommerceNet Labs Technical Report 06-02, May 2006.
Weiyi Ge et al., "Object Link Structure in the Semantic Web", ESWC 2010, Lecture Notes in Computer Science vol. 6089, 2010, pp. 257-271.
Claudia D'Amato et al., "Combining Semantic Web Search with the Power of Inductive Reasoning", 4th International Conference, SUM 2010, Toulouse, France, Sep. 27-29, 2010, Proceedings, pp. 1-15.
Marco Cadoli et al., "A Survery on Knowledge Compilation", Journal on AI Communications, Dec. 1997, pp. 137-150, IOS Press Amsterdam, vol. 10, Issue 3, 4.
Frank Van Harmelen et al., "Approximate Reaasoning for the Semantic Web", Teh 18th European Summer School in Logic, Language and Information, Jul. 31-Aug. 11, 2006.
Claudia D'Amato et al., "Inductive Reasoning and Semantic Web Search", SAC 10, Mar. 22-26, 2010, Sierre, Switzerland.
Notification of Transmittal of the International Search Report and the Written Opinion of the International Searching Authority, May 3, 2012.

* cited by examiner

200 A computer program product

204 A signal bearing medium

202 at least one of one or more instructions for selecting a hub that is resolved with a number of semantic data based on a resolution rule, when the number of the semantic data is greater than a threshold in an offline environment;

one or more instructions for calculating a semantic data set that is associated with the hub based on a searching approach and the resolution rule in the offline environment;

one or more instructions for indexing the semantic data set in the offline environment;

one or more instructions for modifying the semantic database to include the semantic data set in the offline environment; and/or one or more instructions for retrieving information from the semantic data set in an online environment

206 a communication medium

208 a non-transitory computer readable medium

210 a recordable medium

FIG. 2

METHOD AND SYSTEM FOR RETRIEVING INFORMATION FROM SEMANTIC DATABASE

CROSS-REFERENCE TO RELATED APPLICATIONS

The present application is a U.S. National Stage filing under 35 U.S.C. §371 of International Application No. PCT/CN2011/077615, filed on Jul. 26, 2011 and entitled "METHOD AND SYSTEM FOR RETRIEVING INFORMATION FROM SEMANTIC DATABASE." The International Application, including any appendices or attachments thereof, is incorporated by reference herein in its entirety.

TECHNICAL FIELD

The present disclosure relates generally to a semantic web and more specifically to techniques for retrieving information from semantic databases.

BACKGROUND OF THE DISCLOSURE

A semantic web includes various semantic data. The semantic web extends the network of hyperlinked human-readable web pages by inserting machine-readable metadata about pages, and how the pages are related to each other, enabling a machine to access the semantic web more intelligently and perform tasks independently.

SUMMARY

Some embodiments of the present disclosure may generally relate to methods for retrieving information from a semantic database having a plurality of semantic data. One example method may include selecting a hub that is resolved with a number of semantic data based on a resolution rule, when the number of the semantic data is greater than a threshold in an offline environment; calculating a semantic data set that is associated with the hub based on a searching approach and the resolution rule in the offline environment; indexing the semantic data set in the offline environment; modifying the semantic database to include the semantic data set in the offline environment; and retrieving information from the semantic data set in an online environment.

Other embodiments of the present disclosure may generally relate to computer-readable media containing instructions for retrieving information from a semantic database having a plurality of semantic data. One example computer-readable media may contain instructions, which when executed by a computing device, causes the computing device to select a hub that is resolved with a number of semantic data based on a resolution rule, when the number of the semantic data is greater than a threshold in an offline environment; calculate a semantic data set that is associated with the hub based on a searching approach and the resolution rule in the offline environment; index the semantic data set in the offline environment; modify the semantic database to include the semantic data set in the offline environment; and retrieve information from the semantic data set in an online environment.

Additional embodiments of the present disclosure may generally relate to computing devices configured to retrieve information from a semantic database having a plurality of semantic data. One example computing device may contain a processing unit. The processing unit is configured to select a hub that is resolved with a number of semantic data based on a resolution rule, when the number of the semantic data is greater than a threshold in an offline environment; calculate a semantic data set that is associated with the hub based on a searching approach and the resolution rule in the offline environment; index the semantic data set in the offline environment; modify the semantic database to include the semantic data set in the offline environment; and retrieve information from the semantic data set in an online environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

FIG. 2 shows a block diagram of an illustrative embodiment illustrating a computer program product that is arranged for retrieving information from a semantic database.

DETAILED DESCRIPTION

Figure 1:
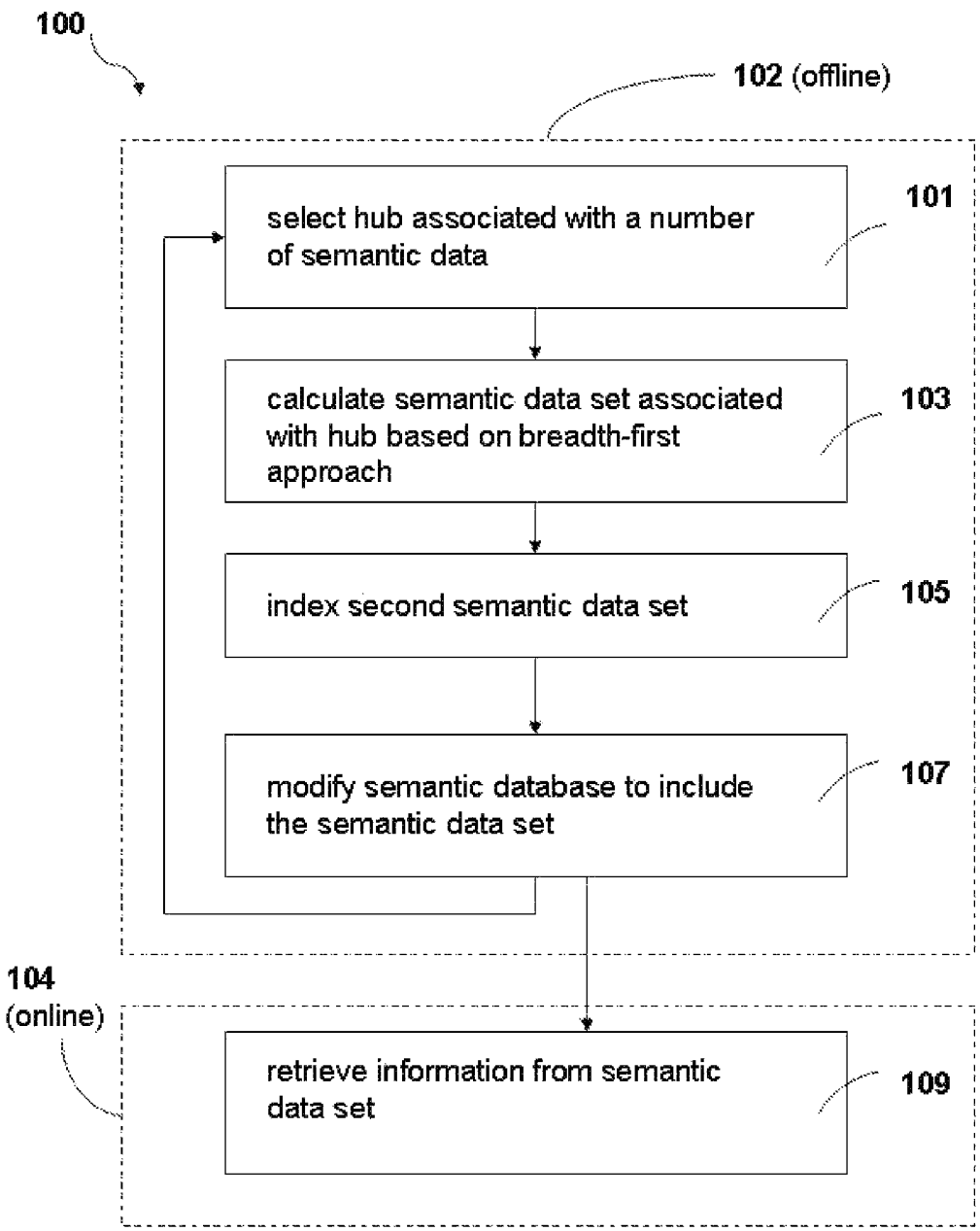
FIG. 1 is a flow chart of an illustrative embodiment of a method for retrieving information from a semantic database.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of retrieving information from a semantic database having a plurality of semantic data sets.

In this disclosure, a resolution rule exists between two semantic data if they are resolved. A semantic data can be semantically translated to a First-order Logic (FOL) formula, which is constructed by atomic symbols and operators using a set of rules. The operators may include, without limitation, negation $\neg$, conjunction $\wedge$, disjunction $\vee$, existential qualifier $\exists$, universal qualifier $\forall$, and etc. A FOL formula can be transformed into a standard formula if all negation operations in it are close to atomic symbols. Two standard FOL formulas can be resolved if there exists an atomic symbol in the first standard formula and the negation of the atomic symbol in the second standard formula. The two standard formulas have a resolvent. Two semantic data can be resolved if their corresponding standard FOL formulas are resolved. Two semantic data are semantically equivalent if the two semantic data have the same interpretation. In this disclosure, a "hub" generally refers to a semantic data that is associated with a semantic data set based on a resolution rule.

In the disclosure, a semantic database is analogized to a scale-free network. Any one of the semantic data in the semantic database may correspond to a node in the scale-free network. When two semantic data are resolved, an undirected network link may be deemed to form between the two semantic data. In a scale-free network, only few nodes have a large number of links to other nodes, which are typically called hub nodes. Similarly, only few semantic data in the semantic database is resolved with a large number of semantic data. The semantic data which is resolved with a number of semantic data more than a predetermined threshold is defined as a "hub" in the semantic database.

In some embodiments, retrieving information from a semantic database having a plurality of semantic data may include offline processing operations and online processing operations. The offline processing operations may be continuously carried out in the background to compile the semantic database. In response to a query, the online processing operations may include performing a reasoning task to the query and retrieving information from the compiled semantic database based on the result of the reasoning task.

The offline processing operations may include constructing a network in the semantic database and selecting hubs in the semantic database. As set forth above, a semantic data in the semantic database may be analogized to a node in a scale-free network. A hub in the semantic database generally refers to a semantic data which is resolved with a number of semantic data, where the number of the semantic data resolved with the hub is greater than a predetermined threshold.

Degree of the semantic data is defined as the number of links of the semantic data in the analog scale-free network. Selection of a semantic data to be a hub in the semantic database is based on the degree of the semantic data. If the degree of the semantic data is greater than the average degree of all calculated semantic data in the semantic database to a threshold (e.g., a specified times of the average degree), then the semantic data is selected as a hub. In a very big or even infinite semantic database, calculation of the average degree can be gradually approximated, depends on the computation ability and time.

The offline processing operations further includes calculating a semantic data set that is associated with a hub selected as set forth above. The calculation may be based on a breadth-first method. In the first level of the breadth-first method, for a specific hub, the calculation may include calculating resolvents of the hub and the semantic data which directly links to the hub based on a resolution rule. The directly linked semantic data is selected as a part of the semantic data set when it can be resolved with the hub. In the level k greater than 1, the calculation may further include calculating resolvents of the semantic data set selected in the level k−1 and the semantic data which is within a distance of k from the hub based on the resolution rule. When a semantic data within a distance of k from the hub is resolved with any one of semantic data of the semantic data set, the semantic data within a distance of k from the hub is selected as a part of the semantic data set. The number of k should be greater than a specified times of the average path length between the analog nodes in the analog scale-free network. The average path length may be gradually approximated in the very big or infinite semantic database. The calculation of the semantic data set may continually execute in the background, until there are no new implicit semantic data in the current level or the level is greater than a specified value. The implicit semantic data is the semantic data not explicit expressed in the semantic database, while can be implicitly obtained from the semantic database based on the logic reasoning, e.g., deduction, induction, and abduction. The semantic data set may be incomplete and keep growing if the semantic database is very big or infinite. Depending on the computation ability and time, the calculation of the semantic data set may gradually examine most contents of the semantic database.

The offline processing operations may further include compressing the semantic data set. Two or more semantic equivalent data may be mapped to a same new semantic data to decrease the size of the semantic data set.

The offline processing operations may further include indexing the compressed semantic data set. For a semantic data set associated with a hub, the semantic data in the semantic data set is indexed to quickly retrieve semantic data associated with a given symbol.

In response to a query associated with the first semantic data, the online processing operations may include locating the semantic data set through all hubs. When the query and a hub share a common symbol, it indicates the semantic data set associated with the hub is related to the query.

Unlike the conventional approaches, the online processing operations may include retrieving information from the specific semantic data set (e.g., putting the negation of the query in the specific semantic data set), rather from all semantic data in the semantic database.

FIG. 1 is a flow chart of an illustrative embodiment of a method 100 for retrieving information from a semantic database. The method 100 may include one or more operations, functions, or actions illustrated by blocks 101, 103, 105, 107, and 109. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. The method 100 may begin at block 101.

At block 101, the method 100 may include selecting a hub that is resolved with a number of semantic data based on a resolution rule. The number of the semantic data may be greater than a threshold. For example, the first hub may be a politician's name. The semantic data resolve with the hub may include the various types of information associated with the politician, such as, without limitation, the politician's height, weight, relatives' information, political party, and city of birth. The politician's height may be resolved with the politician's name, because both of them include the name of the politician. The politician's name may be further resolved with any one of the weight, relatives' information, political party, and city of birth.

The number of the semantic data associated with the politician is usually much greater than the number of semantic data set associated with a less public person. However, the number of the semantic data associated with the politician may be less than the number of the semantic data associated with an even more public figure, such as a professional basketball player. The relationships among the plurality of semantic data in the semantic database may be construed in accordance with the resolution rule among them. When a semantic data is resolved with a number of a semantic data that is greater than a threshold, the semantic data (i.e., hub) is then selected. The method continues at block 103.

At block 103, the method 100 may include calculating a semantic data set that is associated with the hub. Depending on the computation ability, a number of semantic data other than the hubs may be selected and then calculated.

A new semantic data may be resolved with a hub itself or a semantic data associated with the hub. Such new semantic data may be included in the semantic data set. Then the new semantic data may be used in the calculation of the implicit semantic data. An implicit semantic data is not originally included in the semantic database, but it can be obtained from the semantic database based on the logic reasoning, such as deduction, induction, and abduction. Alternatively, a new semantic data may not be resolved with any hub or any semantic data associated with any one of the hubs. Then the new semantic data is not a part of the semantic data set.

The selection of the new semantic data may be based on a feasible searching technique, e.g., breadth-first searching or depth-first computation. A computation time interval may be preset in accordance with the computation ability. A number of new semantic data will be selected within the preset computation time interval. The method continues in step 105.

The calculation of the implicit semantic data based on the selected new semantic data is carried out by any feasible technique, for example a breadth-first calculation technique. Given the hub and the selected semantic data described above, in the level 1, the implicit semantic data is calculated by utilizing the resolution rule and logic reasoning between the hub and the semantic data directly resolved with the hub. In the level k (i.e., greater than 1), the calculation of the implicit semantic data may further include calculating resolvents of the semantic data set calculated in the level k−1 and the semantic data which is within a distance of k from the hub based on the resolution rule.

At block 105, the semantic data set associated with any one of hubs may be compressed by keeping only one symbol for all symbols of the same semantic interpretation. Then they are indexed by any technical feasible approaches. The method continues at block 107. At block 107, the indexed semantic data set may be included in the semantic database.

Blocks 101, 103, 105, and 107 may be repeated in sequence so that the contents of the semantic database may keep growing. Blocks 101, 103, 105, and 107 may be continuously carried out in an offline environment. The offline environment in the disclosure generally refers to an environment in which the semantic database may be configured to substantially operate in a disconnected state.

The semantic database may receive a query. At block 109, in response to a query, the method may include retrieving information from the indexed semantic data set associated with a specific hub in an online environment. The online environment in the disclosure generally refers to an environment in which the semantic database may be configured to substantially operate in a state of connectivity and interact with another party. When both of the query and a specific hub have a symbol in common, the method may include locating the semantic data set associated with the specific hub and retrieving information in response to the query from the semantic data set.

FIG. 2 shows a block diagram illustrating a computer program product that is arranged for selecting a preferred data set. The computer program product 200 may include a signal bearing medium 204, which may include one or more sets of executable instructions 202 that, when executed by, for example, a processor of a computing device, may provide at least the functionality described above and illustrated in FIG. 1.

In some implementations, the signal bearing medium 204 may encompass a non-transitory computer readable medium 208, such as, but not limited to, a hard disk drive, a Compact Disc (CD), a Digital Versatile Disk (DVD), a digital tape, memory, etc. In some implementations, the signal bearing medium 204 may encompass a recordable medium 210, such as, but not limited to, memory, read/write (R/W) CDs, R/W DVDs, etc. In some implementations, the signal bearing medium 204 may encompass a communications medium 206, such as, but not limited to, a digital and/or an analog communication medium (e.g., a fiber optic cable, a waveguide, a wired communications link, a wireless communication link, etc.) The computer program product 200 may also be recorded in the non-transitory computer readable medium 208 or another similar recordable medium 210.

Figure 3:
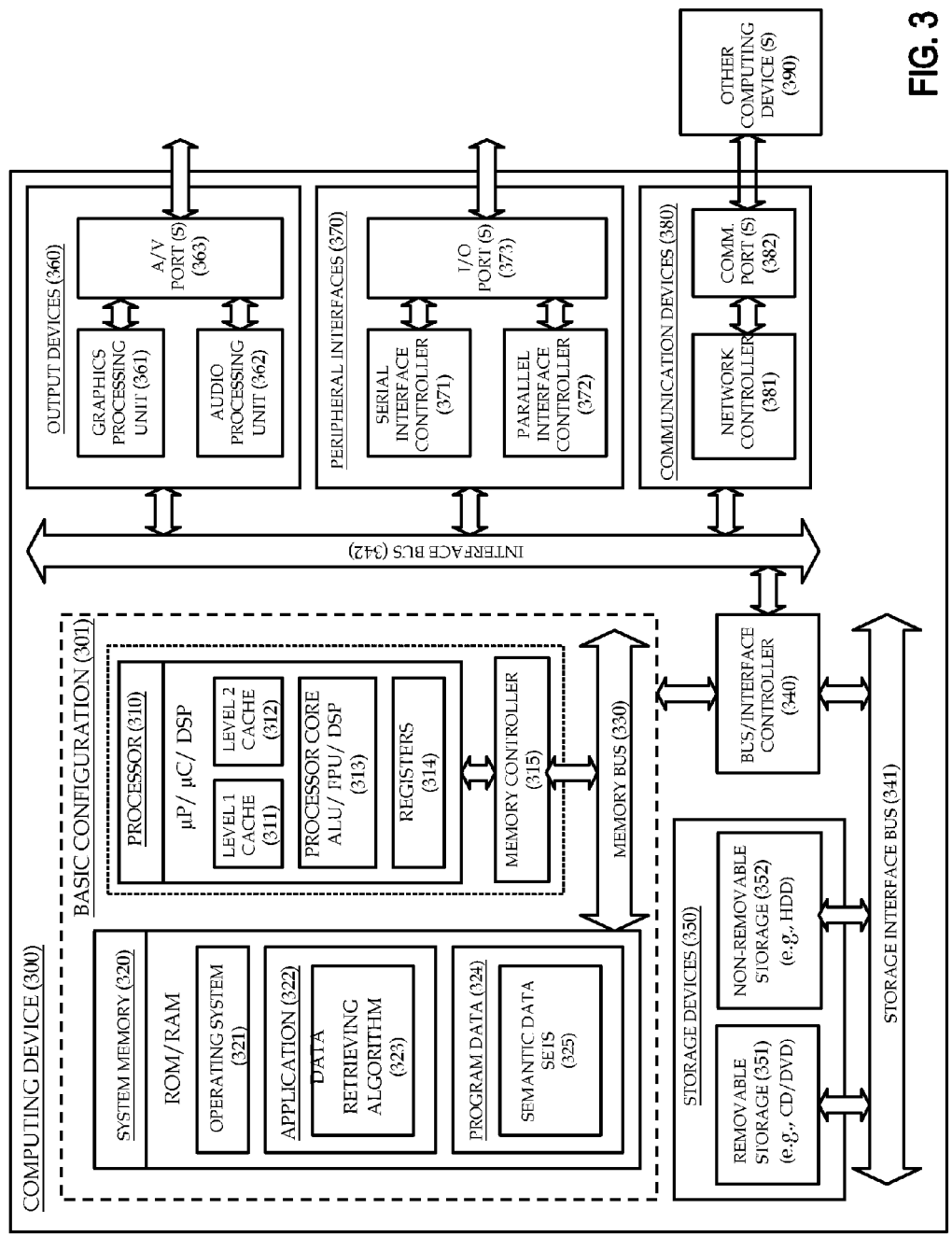
FIG. 3 shows a block diagram of an illustrative embodiment of a computing device that is arranged for retrieving information from a semantic database, all arranged in accordance with at least some embodiments of the present disclosure.

FIG. 3 shows a block diagram of an illustrative embodiment of a computing device that is arranged for selecting a preferred data set. In a very basic configuration 301, computing device 300 typically includes one or more processors 310 and a system memory 320. A memory bus 330 may be used for communicating between processor 310 and system memory 320.

Depending on the desired configuration, processor 310 may be of any type including but not limited to a microprocessor (µP), a microcontroller (µC), a digital signal processor (DSP), or any combination thereof. Processor 310 may include one more levels of caching, such as a level one cache 311 and a level two cache 312, a processor core 313, and registers 314. An example processor core 313 may include an arithmetic logic unit (ALU), a floating point unit (FPU), a digital signal processing core (DSP Core), or any combination thereof. An example memory controller 315 may also be used with processor 310, or in some implementations memory controller 315 may be an internal part of processor 310.

Depending on the desired configuration, system memory 320 may be of any type including but not limited to volatile memory (such as RAM), non-volatile memory (such as ROM, flash memory, etc.) or any combination thereof. System memory 320 may include an operating system 321, one or more applications 322, and program data 324. In some embodiments, application 322 may include a data retrieving algorithm 323 that is arranged to perform the functions as described herein including those described with respect to the steps 101 and 109 of the method 100 of FIG. 1. Program data 324 may include semantic data sets 325 that may be useful for the operation of data retrieving algorithm 323 as will be further described below. In some embodiments, the semantic data sets 325 may include, without limitation, the first semantic data set and the second semantic data set of blocks 101 and 103 of FIG. 1, respectively. In some embodiments, application 322 may be arranged to operate with program data 324 on operating system 321 such that implementations of selecting preferred data set may be provided as described herein. This described basic configuration 301 is illustrated in FIG. 3 by those components within the inner dashed line.

In some other embodiments, application 322 may include data retrieving algorithm 323 that is arranged to perform the functions as described herein including those described with respect to the steps 101 and 109 of the method 100 of FIG. 1.

Computing device 300 may have additional features or functionality, and additional interfaces to facilitate communications between basic configuration 301 and any required devices and interfaces. For example, a bus/interface controller 340 may be used to facilitate communications between basic configuration 301 and one or more data storage devices 350 via a storage interface bus 341. Data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 320, removable storage devices 351 and non-removable storage devices 352 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 342 for facilitating communication from various interface devices (e.g., output devices 360, peripheral interfaces 370, and communication devices 380) to basic configuration 301 via bus/interface controller 340. Example output devices 360 include a graphics processing unit 361 and an audio processing unit 362, which may be configured to communicate to various external devices such as a display or speakers via one or more A/V ports 363. Example peripheral interfaces 370 include a serial interface controller 371 or a parallel interface controller 372, which may be configured to communicate with external devices such as input devices (e.g., keyboard, mouse, pen, voice input device, touch input device, etc.) or other peripheral devices (e.g., printer, scanner, etc.) via one or more I/O ports 373. An example communication device 380 includes a network controller 381, which may be arranged to facilitate communications with one or more other computing devices 390 over a network communication link via one or more communication ports 382. In some embodiments, the other computing devices 390 may include other applications, which may be operated based on the results of the application 322.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for retrieving information from a semantic database having a plurality of semantic data in response to a query, comprising:

translating, by one or more processors, each of the plurality of semantic data to a first-order logic formula constructed by one or more atomic symbols and operators;

selecting, by one or more processors, a first semantic data as a hub in an offline environment from the plurality of semantic data, wherein the first semantic data is resolved with a number of semantic data based on a resolution rule, and the number of the semantic data resolved with the hub is greater than a threshold, wherein a first standard formula transformed from the translated first-order logic formula of the first semantic data is resolved with a second standard formula transformed from the translated first-order logic formula of any of the number of semantic data, and further wherein one atomic symbol of the atomic symbols exists in the first standard formula and the negation of the atomic symbol exists in the second standard formula;

calculating, by one or more processors, the semantic dataset by calculating in a first level of a searching approach, a first resolvent of (1) the hub and (2) a second semantic data which directly links to the hub based on a resolution rule, and in response to the second semantic data being resolved with the hub, selecting the second semantic data as a part of the semantic data set in the offline environment;

calculating, by one or more processors, the semantic dataset by calculating in a second level of the searching approach, a second resolvent of (1) the semantic data set resulted in the first level of the searching approach and (2) a third semantic data which is within a predetermined distance from the hub, and in response to the third semantic data being resolved with any semantic data of the semantic data set resulted in the first level of the searching approach, selecting the third semantic data as a part of the semantic data set in the offline environment, wherein the calculating of the semantic data set is continuously executed in a background of the semantic database until a particular calculation limit is reached;

indexing, by one or more processors, the semantic data set in the offline environment;

modifying, by one or more processors, the semantic database to include the indexed semantic data set in the offline environment; and retrieving, by one or more processors, information from the semantic data set in an online environment in response to the query.

2. The method of claim 1, wherein the selecting, the calculating of the semantic data set, the indexing, and the modifying are repeated in sequence.

3. The method of claim 1, wherein the calculating of the semantic data set further comprises calculating an implicit semantic data based on the resolution rule, the semantic data set and logical reasoning.

4. The method of claim 1, further comprising compressing the semantic data set.

5. The method of claim 4, further comprising mapping a fourth semantic data and a fifth semantic data to a sixth semantic data, wherein the fourth semantic data and the fifth semantic data are semantically equivalent.

6. The method of claim 1, wherein the retrieving further comprises locating the semantic data set by comparing a query to the hub.

7. A non-transitory computer-readable storage medium encoded with computer-executable instructions for retrieving information from a semantic database having a plurality of semantic data in response to a query, which in response to execution by a computing device, causes the computing device to:

translate each of the plurality of semantic data to a first-order logic formula constructed by one or more atomic symbols and operators;

select a first semantic data as a hub in an offline environment from the plurality of semantic data, wherein the first semantic data is resolved with a number of semantic data based on a resolution rule, and the number of the semantic data resolved with the hub is greater than a threshold, wherein a first standard formula transformed from the translated first-order logic formula of the first semantic data is resolved with a second standard formula transformed from the translated first-order logic formula of any of the number of semantic data, and further wherein one atomic symbol of the atomic symbols exists in the first standard formula and the negation of the atomic symbol exists in the second standard formula;

calculate the semantic data set by calculating in a first level of a searching approach, a first resolvent of (1) the hub and (2) a second semantic data which directly links to the hub based on a resolution rule, and in response to the second semantic data being resolved with the hub, selecting the second semantic data as a part of the semantic data set in the offline environment;

calculate the semantic data set by calculating in a second level of the searching approach, a second resolvent of (1) the semantic data set resulted in the first level of the searching approach and (2) a third semantic data which is within a predetermined distance from the hub, and in response to the third semantic data being resolved with any semantic data of the semantic data set resulted in the first level of the searching approach, selecting the third semantic data as a part of the semantic data set in the offline environment, wherein the calculating of the semantic data set is continuously executed in a background of the semantic database until a particular calculation limit is reached;

index the semantic data set in the offline environment;

modify the semantic database to include the indexed semantic data set in the offline environment; and retrieve information from the semantic data set in an online environment in response to the query.

8. The non-transitory computer-readable storage medium of claim 7, further containing additional instructions, which in response to execution by the computing device, causes the computing device to repeatedly select the hub, calculate the semantic data set, index the semantic data set, and modify the semantic database in sequence.

9. The non-transitory computer-readable storage medium of claim 7, further containing additional instructions, which in response to execution by the computing device, causes the computing device to calculate an implicit semantic data based on the resolution rule, the semantic data set and logical reasoning.

10. The non-transitory computer-readable storage medium of claim 7, further containing additional instructions, which in response to execution by the computing device, causes the computing device to compress the semantic data set.

11. The non-transitory computer-readable storage medium of claim 10, further containing additional instructions, which in response to execution by the computing device, causes the computing device to map a fourth semantic data and a fifth semantic data to a sixth semantic data, wherein the fourth semantic data and the fifth semantic data are semantically equivalent.

12. The non-transitory computer-readable storage medium of claim 7, further containing additional instructions, which in response to execution by the computing device, causes the computing device to locate the semantic data set by comparing a query to the hub.

13. A computing device configured to retrieve information from a semantic database that includes a plurality of semantic data in response to a query, comprising:

a processing unit; and a memory including a plurality of instructions, which in response to execution by the processing unit, causes the processing unit to translate each of the plurality of semantic data to a first-order logic formula constructed by one or more atomic symbols and operators;

select a first semantic data as a hub in an offline environment from the plurality of semantic data, wherein the first semantic data is resolved with a number of semantic data based on a resolution rule, and the number of the semantic data resolved with the hub is greater than a threshold, wherein a first standard formula transformed from the translated first-order logic formula of the first semantic data is resolved with a second standard formula transformed from the translated first-order logic formula of any of the number of semantic data, and further wherein one atomic symbol of the atomic symbols exists in the first standard formula and the negation of the atomic symbol exists in the second standard formula;

calculate the semantic data set by calculating in a first level of a searching approach, a first resolvent of (1) the hub and (2) a second semantic data which directly links to the hub based on a resolution rule, and in response to the second semantic data being resolved with the hub, selecting the second semantic data as a part of the semantic data set in the offline environment;

calculate the semantic data set by calculating in a second level of the searching approach, a second resolvent of (1) the semantic data set resulted in the first level of the searching approach and (2) a third semantic data which is within a predetermined distance from the hub, and in response to the third semantic data being resolved with any semantic data of the semantic data set resulted in the first level of the searching approach, selecting the third semantic data as a part of the semantic data set in the offline environment, wherein the calculating of the semantic data set is continuously executed in a background of the semantic database until a particular calculation limit is reached;

index the semantic data set in the offline environment;

modify the semantic database to include the indexed semantic data set in the offline environment; and retrieve information from the semantic data set in an online environment in response to the query.

14. The computing device of claim 13, wherein the memory includes additional instructions, which in response to execution by the processing unit, causes the processing unit to repeatedly select the hub, calculate the semantic data set, index the semantic data set, and modify the semantic database in sequence.

15. The computing device of claim 13, wherein the memory includes additional instructions, which in response to execution by the processing unit, causes the processing unit to calculate an implicit semantic data based on the resolution rule, the semantic data set and logical reasoning.

16. The computing device of claim 13, wherein the memory includes additional instructions, which in response to execution by the processing unit, causes the processing unit to compress the semantic data set.

17. The computing device of claim 13, wherein the memory includes additional instructions, which in response to execution by the processing unit, causes the processing unit to locate the semantic data set by comparing a query to the hub.

* * * * *